US009183374B2

(12) United States Patent
Carter et al.

(10) Patent No.: US 9,183,374 B2
(45) Date of Patent: Nov. 10, 2015

(54) TECHNIQUES FOR IDENTITY-ENABLED INTERFACE DEPLOYMENT

(75) Inventors: Stephen R Carter, Spanish Fork, UT (US); Douglas Garry Earl, Orem, UT (US)

(73) Assignee: Novell, Inc., Provo, UT (US)

( * ) Notice: Subject to any disclaimer, the term of this patent is extended or adjusted under 35 U.S.C. 154(b) by 257 days.

(21) Appl. No.: 13/182,090

(22) Filed: Jul. 13, 2011

(65) Prior Publication Data

US 2012/0017085 A1 Jan. 19, 2012

Related U.S. Application Data

(60) Provisional application No. 61/364,632, filed on Jul. 15, 2010.

(51) Int. Cl.
*H04L 9/32* (2006.01)
*G06F 21/41* (2013.01)

(52) U.S. Cl.
CPC .............. *G06F 21/41* (2013.01); *H04L 9/3213* (2013.01)

(58) Field of Classification Search
CPC ......... G06F 21/10; G06F 21/34; G06F 21/44; G06F 21/445; H04L 63/08; H04L 63/0807; H04L 63/0823; H04L 63/0869; H04L 63/205; H04L 9/088; H04L 9/0891; H04L 9/32; H04L 9/3213
USPC ................... 726/7, 19, 21, 22, 1–5, 9–10, 12, 726/26–29; 713/150, 155–159, 168–169, 713/172–173, 182, 185; 709/201–202, 709/204–205, 218, 223, 225, 229, 249
See application file for complete search history.

(56) References Cited

U.S. PATENT DOCUMENTS

| 6,601,171 | B1 * | 7/2003 | Carter et al. .................. 713/175 |
| 6,760,840 | B1 * | 7/2004 | Shimbo et al. ................ 713/165 |
| 7,886,038 | B2 | 2/2011 | Ferris |
| 7,945,952 | B1 * | 5/2011 | Behforooz ...................... 726/22 |
| 8,087,068 | B1 * | 12/2011 | Downey et al. ................... 726/4 |
| 8,271,797 | B2 * | 9/2012 | Araki et al. .................... 713/182 |
| 8,321,933 | B2 * | 11/2012 | Traenkenschuh et al. ...... 726/22 |
| 2003/0105810 | A1 * | 6/2003 | McCrory et al. .............. 709/203 |

(Continued)

OTHER PUBLICATIONS

"DMRF: Interoperable Clouds—A White Paper form the Open Cloud Standards Incubator" [Online], Nov. 11, 2009 [Retrieved on: Aug. 13, 2013], 1-21 [Retrieved from: http://www.dmtf.org/sites/default/files/standards/documents/DSP-IS0101_1.0.0.pdf].*
Swensen, Todd, "Annexing the Cloud: Exploring a smarter approach to cloud security" [Online], Jan. 15, 2010 [Retrieved on: Feb. 23, 2014], Novell Connection, www.novell.com, [Retreived from: http://www.novell.com/connectionmagazine/2010/01/novell_cloud_security_service.html].*

(Continued)

*Primary Examiner* — Eric W Shepperd
(74) *Attorney, Agent, or Firm* — Schwegman Lundberg & Woessner, P.A.

(57) ABSTRACT

Techniques for providing identity-enabled interfaces for deployment are presented. Specifically, an agent of an enterprise infrastructure authenticates and acquires an agent identity for interacting with a cloud processing environment. Once the agent is deployed in the cloud processing environment, enterprise policy can be enforced within the cloud processing environment on actions occurring within the cloud. The agent acts as an Application Programming Interface between the enterprise and the cloud processing environment. The reverse is also achievable, where a cloud deploys an agent to the enterprise to deploy a cloud interface within the enterprise for policy enforcement.

8 Claims, 4 Drawing Sheets

(56) References Cited

U.S. PATENT DOCUMENTS

| | | | |
|---|---|---|---|
| 2005/0138204 A1* | 6/2005 | Iyer et al. | 709/242 |
| 2009/0119500 A1* | 5/2009 | Roth et al. | 713/100 |
| 2010/0106678 A1* | 4/2010 | Pietrek et al. | 706/54 |
| 2010/0115420 A1* | 5/2010 | De Gibon et al. | 715/751 |
| 2010/0125855 A1* | 5/2010 | Ferwerda et al. | 719/317 |
| 2010/0228849 A1* | 9/2010 | Moore et al. | 709/224 |
| 2010/0306377 A1 | 12/2010 | DeHaan et al. | |
| 2011/0016536 A1* | 1/2011 | O'Brien et al. | 726/28 |
| 2011/0047204 A1* | 2/2011 | Mansoor et al. | 709/202 |
| 2011/0055385 A1 | 3/2011 | Tung et al. | |
| 2011/0072487 A1* | 3/2011 | Hadar et al. | 726/1 |
| 2011/0154212 A1 | 6/2011 | Gharpure et al. | |
| 2011/0213687 A1* | 9/2011 | Ferris et al. | 705/34 |
| 2011/0213691 A1* | 9/2011 | Ferris et al. | 705/37 |
| 2011/0243553 A1* | 10/2011 | Russell | 398/25 |
| 2011/0307947 A1* | 12/2011 | Kariv et al. | 726/9 |
| 2012/0011578 A1* | 1/2012 | Hinton et al. | 726/8 |
| 2012/0271936 A1* | 10/2012 | Burch et al. | 709/224 |

OTHER PUBLICATIONS

Celesti et al, "How to Enhane Cloud Architectures to Enable Cross-Federation" [Online], Jul. 10, 2010 [Retreived on Feb. 23, 2014], 2010 IEEE 3rd International Conference on Cloud Computing [Retrieved from: http://ieeexplore.ieee.org/stamp/stamp.jsp?tp=&arnumber=5557976 ].*

"DMTF: Architecture for Managing Clouds—A White Paper from the Open Cloud Standards Incubator", http://dmtf.org/sites/default/files/standards/documents/DSP-IS0102_1.0.0.pdf, (Jun. 18, 2010), 1-57.

"DMTF: Use Cases and Interactions for Managing Clouds—A White Paper from the Open Cloud Standards Incubator", http://dmtf.org/sites/default/files/standards/documents/DSP-IS0103_1.0.0.pdf, (Jun. 18, 2010), 1-75.

"Wikipedia: SAML 2.0", http://en.wikipedia.org/w/index.php?title+SAML_2.0&oldid=354536741, (Apr. 7, 2010), 1-22.

"European Application Serial No. 11174074.2, Examination Notification Art. 94(3) mailed Sep. 1, 2014", 6 pgs.

* cited by examiner

TECHNIQUES FOR IDENTITY-ENABLED INTERFACE DEPLOYMENT

RELATED APPLICATIONS

The present disclosure is: a non-provisional filing of, is co-pending with, and claims priority under 35 U.S.C. 119(e) to U.S. Provisional Patent Application Ser. No. 61/364,632, filed on Jul. 15, 2010, entitled: "Identity-Enabled Management Interface," the disclosure of which is incorporated by reference herein and below in its entirety.

BACKGROUND

The Internet is rapidly evolving to include an operational mode called Cloud Computing and Cloud Storage. The intent of these new modes is the reduction of enterprise data centers and the excess capacity contained in such. In order to provide services to customers, the enterprise is often compelled to host high levels of excess capacity (sometimes over 80%) to take care of unanticipated traffic (e.g., a national emergency such as Sep. 11, 2001 (planes hitting the Twin-Towers in New York City, N.Y.) and anticipated traffic (e.g., the Christmas consumer buying season). The cloud operational characteristics allow an enterprise to quickly utilize computing and storage capacity in the cloud when increases in traffic or some other increase in the need for computing and storage resources is needed. However, this capability must be supported by an appropriate API by cloud providers, which heretofore is unavailable.

SUMMARY

In various embodiments, techniques for identity-enabled interface deployment are presented. More specifically, and in an embodiment, a method for interface deployment is provided.

Particularly, a cloud agent is configured for deployment within a target cloud environment. The cloud agent is configured within an enterprise environment. The cloud agent is authenticated and a cloud agent identity is obtained. Next, an expiration condition is assigned to the cloud agent identity that when satisfied renders the cloud agent identity invalid and the cloud agent is deployed to the target cloud environment for enforcement of enterprise policy within the target cloud environment, via the cloud agent.

DETAILED DESCRIPTION

Figure 1:
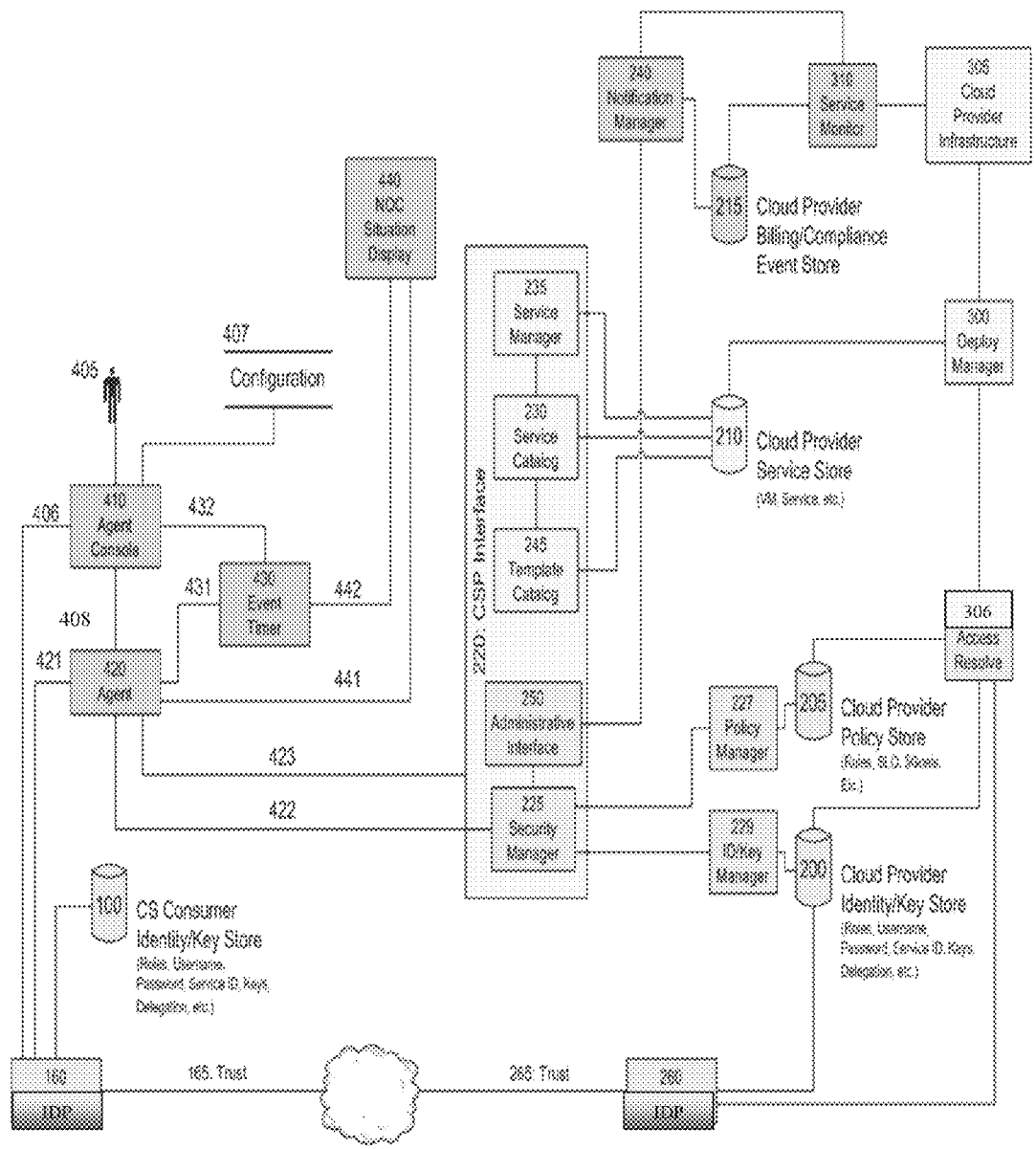
FIG. 1 is a diagram of an architecture for identity-enabled interface deployment within a cloud network, according to an example embodiment.

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines, storage, software libraries, software systems, etc. that form a logical computing infrastructure. A "logical computing infrastructure" means that computing resources can be geographically distributed across a network, such as the Internet. So, one computing resource at network site X can be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

The phrase "cloud network" refers to a network of cloud processing environments logically being managed as a single collective network.

The embodiments herein provide techniques so that a Cloud Management Application Programming Interface (API) can be used by an enterprise to provide identity, role, and other such mechanisms via the API so that workloads in the cloud can be positively identified and the appropriate policies applied within the cloud.

Various embodiments of this invention can be implemented in existing network architectures. For example, in some embodiments, the techniques presented herein are implemented in whole or in part in the Novell® network and proxy server products, operating system products, cloud-based products or services, directory-based products and other products and/or services distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory and computer-readable or processor-readable storage media and processed on the machines (processing devices) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-4.

FIG. 1 is a diagram of an architecture for identity-enabled interface deployment within a cloud network, according to an example embodiment. It is noted that the architecture is presented for purposes of illustration and that other arrangements are possible to achieve the beneficial teachings presented herein and below.

Again, embodiments and components of the architecture are implemented, programmed, and reside in a non-transitory computer-readable medium that executes on one or more processors that are specifically configured to process the components described herein and below.

The FIG. 1 shows an embodiment in terms of the architecture diagram contained in the Distributed Management Task Force (DMTF) Cloud Management Architecture white paper (DSP-IS0102_1.0.0). All 400-level diagram elements are provided and integrated in a novel manner by the embodiments presented herein to enhance and improve on the DMTF teachings.

An administrator 405 or Configuration mechanism 407 provides information to the Agent Console 410 concerning Agents 420 that are to interact with the various cloud providers via a Cloud Service Provider (CSP) Interface 220. The CSP interface includes a service manager 235, a service catalog 230, a template catalogue 245, an administrative interface 250, and a security manager 225. The Cloud Provider also having a Cloud Provider Infrastructure 305, a Cloud Provider Billing/Compliance Event Store 215, a Cloud Provider Policy Store 205 (managed via a Policy Manager 227), and a Cloud Provider Identity/Key Store 200 (managed via an ID/Key Manager 229). The Cloud Provider Infrastructure 305 having interfaced components for a Deploy Manager 300 having access to the Cloud Provider Service Store 210 and an Access Resolve component 306 having access to the Cloud Provider Policy Store 205 (which the Policy Manager 227 has access to), and the Access Resolve component 306 interfaced to the Cloud Provider Identity/Key Store 200, which is accessed by the ID/Key Manager 229.

In an embodiment, the Agent Console 410 authenticates with the Identity Provider of Identity Service (IDP) 160 via 406 with credentials provided by the administrator 405 or Configuration mechanism 407. The authentication causes the crafting of an identity (e.g., SAML assertion) that contains the rights, permissions, roles, etc. that the Agent Console 410 is allowed to operate with. The Configuration mechanism 407 accessible to by the Agent Console 410 and the Agent Console 410 interfaced to the Agent 420 over link 408. The IDP 160 establishes trust with other IDPs 260 via 165 and 265.

Implicit in, but not shown in, the FIG. 1 is the presence of a Policy Decision Point (PDP) that evaluates each action in terms of the identity and the rights, permissions, roles, etc. contained within the identity.

The Agent Console 410, using information provided by the administrator 405 or Configuration mechanism 407 starts, stops, clones, etc. Agent 420 and provides operational events via Configuration mechanism 407 such that the Agent 420 is able to interact with a Cloud Provider as detailed below. The Agent Console 410 also communicates with Event Timer 430 via 432 and the Agent 420 communicates with the CSP Interface 220 or the Security Manager 225 directly via 423 and 422, respectively.

The Agent 420 communicates with the IDP 160 and authenticates via credentials obtained via Configuration mechanism 407. The IDP 160 has access to a Consumer Identity/Key Store 100. Successful authentication provides the Agent 420 with an identity (e.g., SAML assertion) that contains rights, permissions, roles, etc. that the Agent 420 is allowed to operate with. Also contained within the identity is a TTL (Time-To-Live setting) or some other expiration specification. If the Agent 420 is expected to operate longer than the expiration specification, an event is sent to Event Timer 430 via 431 that serves to allow Event Timer 430 to provide an event to Agent 420 and/or Agent Console 410 and/or Network Operations Center (NOC) Situation Display 440 that results in credentials being provided to Agent 420 so that a new authentication can be affected via 421, which extends the expiration specification.

In an embodiment, the NOC Situation Display 440 receives events via 441 and 442, which are displayed in the NOC operational display to allow NOC personnel to perform the appropriate activities (e.g., provide new credentials to Agent 420, etc.).

The Agent 420 communicates securely (e.g., via Secure Sockets Layer (SSL))) with the Security Manager 225 within the CSP Interface 220 via the mechanism specified by the cloud provider (e.g., (Representational State Transfer (RESTful), REST-like, Simple Object Access Protocol (SOAP), Remote Procedure Call (RPC), etc.) requesting authentication of Agent 420 and does so by providing the identity obtained via 421. The identity is verified by Security Manager 225 by validating the identity (e.g., (Security Assertion Markup Language (SAML) assertion) via the IDP 260, which has a trust relationship previously established with the IDP 160. The trust relationship details the trust level that the cloud provider has with the enterprise so that the validity of the identity can be ascertained (e.g., verify the SAML assertion's digital signature) as well as validating the rights, permissions, roles, etc. that the Agent 420 is requesting to act under. The Security Manger 225 returns to the Agent 420 a token that is specific to the cloud provider's infrastructure and that is used with other requests from Agent 420 to the CSP Interface 220.

In an embodiment, The Security Manager 225 within the CSP Interface 220 communicates securely (e.g., via SSL) with the Agent 420 via the mechanism specified by the cloud provider (e.g., RESTful, REST-like, SOAP, RPC, etc.) requesting authentication of Security Manager 225 within the CSP Interface 220 and does so by providing an identity obtained from IDP 260 by the Security Manager 225. The identity is verified by Agent 420 by validating the identity (e.g., SAML assertion) via the IDP 160, which has a trust relationship previously established with the IDP 260. The trust relationship details the trust level the cloud provider has with the enterprise so that the validity of the identity can be ascertained (e.g., verify the SAML assertion's digital signature) as well as validating the rights, permissions, roles, etc. that the Security Manager 225 within the CSP Interface 220 is requesting to act under. The Agent 420 returns to the Security Manager 225 within the CSP Interface 220 a token that is specific to the enterprise infrastructure and that is used with other requests from Security Manager 225 within the CSP Interface 220 to the Agent 420.

If both of the previous processing scenarios are used then a bidirectional mechanism is established so that requests from the enterprise to the cloud provider and from the cloud provider to the enterprise can be processed while applying policy (via the PDP) to all requests. In either case (one way or two ways) all requests can be evaluated according to identity (rights, permissions, roles, etc.).

The token supplied as specified above may be a Globally Unique Identifier (GUID) or a more complex structure, which is provided with subsequent requests. Receiving processes can validate the request by establishing the relationship between the token and trust relationship (perhaps by a table look up or request to the IDP to verify). The intent is to replace the heavy-weight identity (e.g., SAML) process with something much easier and quicker to implement/process. The token may or may not be encrypted. If it is encrypted, the token can be encrypted via a symmetric key since the processing load of a symmetric key cryptogram is much less than that of an asymmetric cryptogram. Although if desired, the token in other embodiments can also be encrypted using asymmetric mechanisms as well.

Note that the token may have an expiration specification that is different from the identity expiration specification. This particular expiration specification is handled internal to the Agent 420 or Security Manager 225 within the CSP Interface 220 because the renewal of the token is based on the already established identity. However, if the identity expiration specification is to expire before the next token expiration, the mechanism specified above for obtaining a new identity is performed followed by the steps to obtain a new token.

With the invention, a secure and identity-enabled processing environment can be established between an enterprise and a cloud provider.

Figure 2:
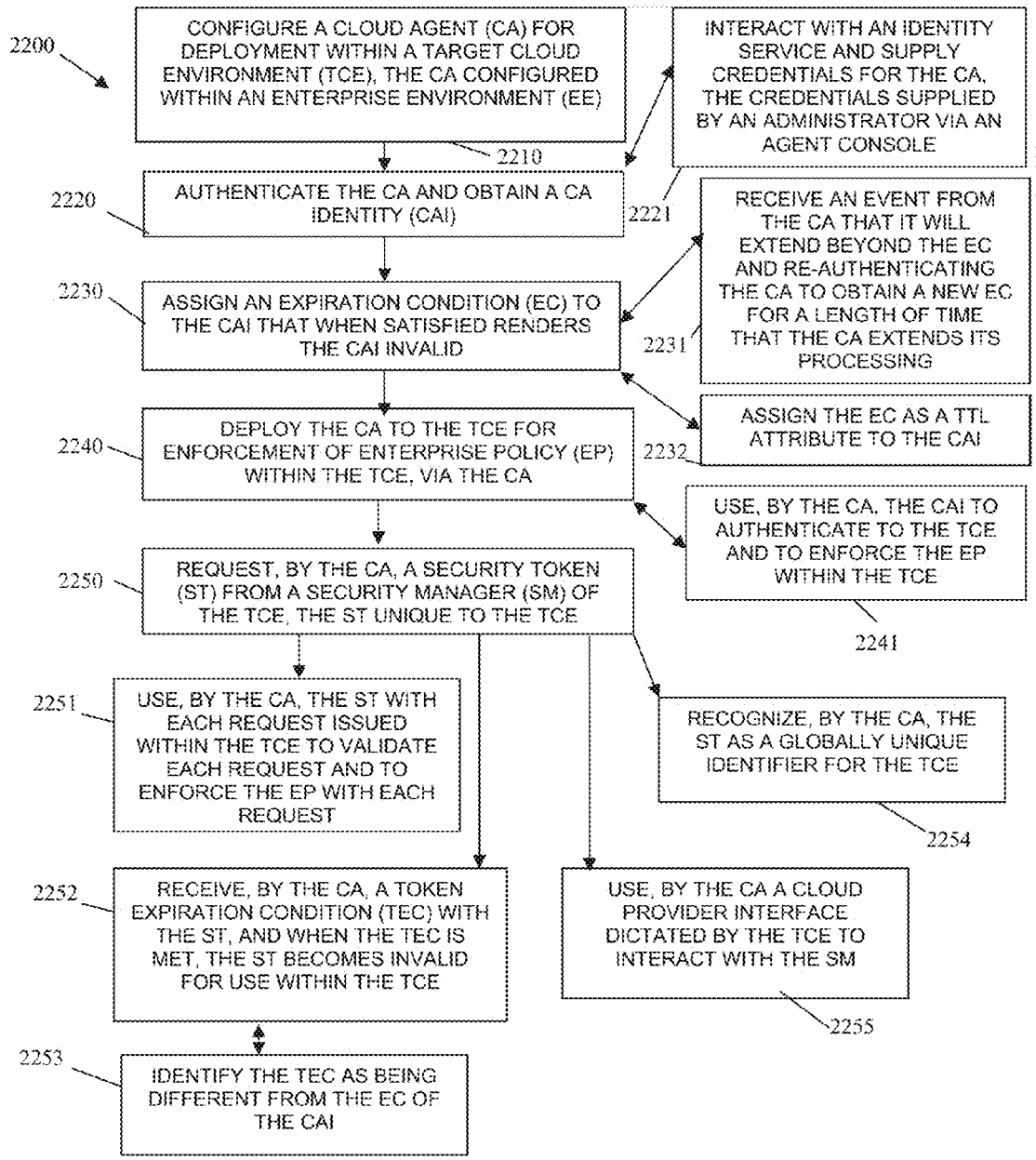
FIG. 2 is a method for identity-enabled interface deployment, according to an example embodiment.

FIG. 2 is a method 2200 for identity-enabled interface deployment, according to an example embodiment. The method 2200 (herein after referred to as "cloud interface deployment manager") is implemented, programmed, and resides within a non-transitory computer-readable storage medium. One or more processors of a network are specifically configured to execute the cloud interface deployment manager. The network may be wired, wireless, or a combination of wired and wireless.

At 2210, the cloud interface deployment manager configures a cloud agent for deployment to a target cloud environment. The cloud agent is configured to process on the processors of the target cloud environment and to use interfaces that the target cloud environment uses.

At 2220, the cloud interface deployment manager authenticates the cloud agent and obtains a cloud agent identity. This can occur in a variety of manners and through a variety of interactions as discussed above with reference to the FIG. 1.

For example, at 2221, the cloud interface deployment manager interacts with a third-party identity service. Credentials are supplied for the cloud agent. In one case, the credentials are supplied to the identity service via an administrator that uses an agent console (as discussed and presented above with reference to the FIG. 1).

At 2230, the cloud interface deployment manager assigns an expiration condition to the cloud agent identity. When the expiration condition is satisfied, the cloud agent identity becomes invalid or unusable.

According to an embodiment, at 2231, the cloud interface deployment manager receives an event from a cloud agent that it will extend beyond the expiration condition. In response to this event, the cloud interface deployment manager re-authenticates the cloud agent to obtain a new and updated expiration condition that lasts for a length of time that the cloud agent anticipates to extend processing for.

In another case, at 2232, the cloud interface deployment manager assigns the expiration condition as a time-to-live (TTL) attribute to the cloud agent identity.

At 2240, the cloud interface deployment manager deploys the cloud agent to the target cloud environment for enforcement of enterprise policy within the target cloud environment. According to an embodiment at 2241, the cloud interface deployment manager uses the cloud agent identity to authenticate to the target cloud environment and to enforce the Enterprise Policy within the target cloud environment.

In an embodiment, at 2250, the cloud interface deployment manager requests, via the deployed cloud agent, a security token from a security manager of the target cloud environment. The security token is unique to the target cloud environment.

Continuing with the embodiment of 2250 and at 2251, the cloud interface deployment manager uses, via the deployed cloud agent, the security token with each request issued within the target cloud environment to validate each request and to enforce the enterprise policy with each request.

Continuing with the embodiment of 2250 and at 2252, the cloud interface deployment manager receives, via the deployed cloud agent, a token expiration condition with the security token. The security token becomes invalid for use within the target cloud environment when the token expiration condition is met.

Continuing with the embodiment of 2252 and at 2253, the cloud interface deployment manager identifies, via the deployed cloud agent, the token expiration condition as being different from the expiration condition of the cloud agent identity.

Still continuing with the embodiment of 2250 and at 2254, the cloud interface deployment manager recognizes, via the deployed cloud agent, the security token as a globally unique identifier for the target cloud environment.

Again continuing with the embodiment of 2250 and at 2255, the cloud interface deployment manager uses, via the deployed cloud agent, a cloud provider interface dictated by the target cloud environment to interact with the security manager of the target cloud environment.

Figure 3:
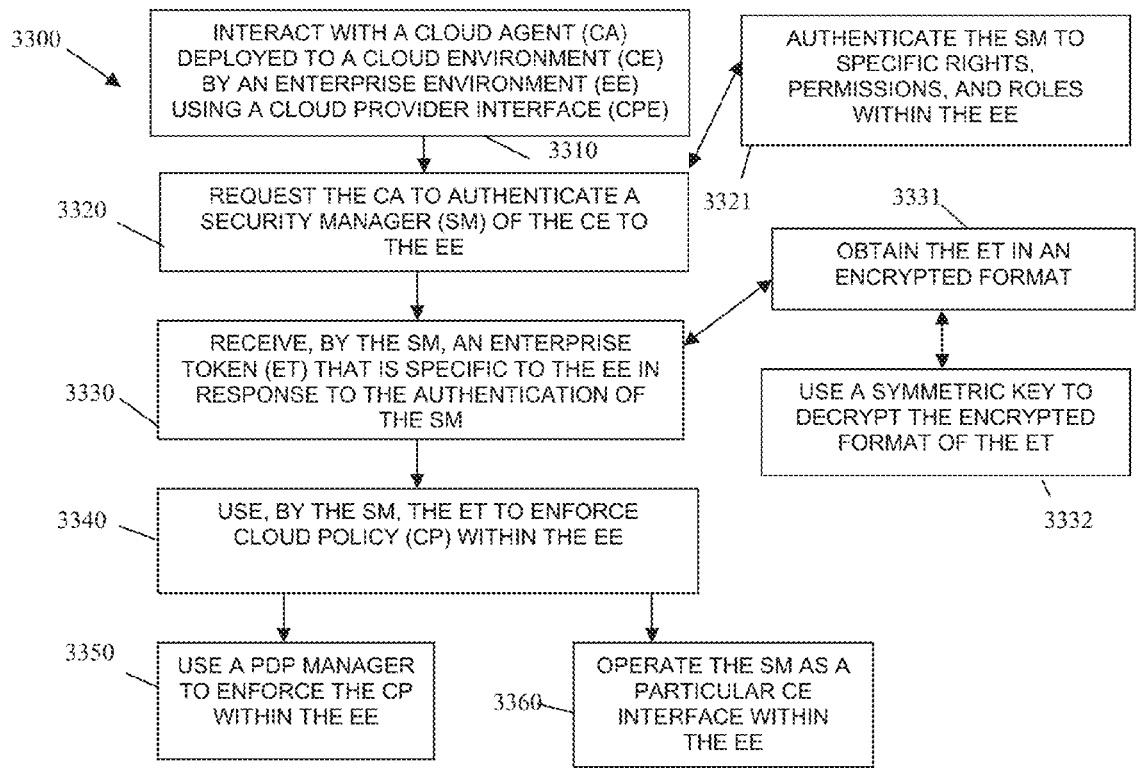
FIG. 3 is a diagram of another method for identity-enabled interface deployment, according to an example embodiment.

FIG. 3 is a diagram of another method 3300 for identity-enabled interface deployment, according to an example embodiment. The method 3300 (herein after referred to as "enterprise interface deployment manager") is implemented, programmed, and resides within a non-transitory computer-readable storage medium. One or more processors of a network are specifically configured to execute the cloud interface deployment manager.

The cloud interface deployment manager represented by the method 2200 of the FIG. 2 is presented from the perspective of an enterprise deploying an interface for policy enforcement in a cloud environment. Whereas the enterprise interface deployment manager is presented from the perspective of a cloud interface being deployed in an enterprise environment. It is not that the two methods 2200 and 3300 are not mutually exclusive such that both can be operational to establish a bi-directional deployment of identity based interfaces.

At 3310, the enterprise interface deployment manager interacts with a cloud agent. The cloud agent previously deployed to a cloud environment by an enterprise environment using a cloud provider interface. The mechanism for deploying the cloud agent was presented above with respect to the FIGS. 1 and 2.

At 3320, the enterprise interface deployment manager requests that the cloud agent authenticate a security manager of the cloud environment to the enterprise environment. So, the deployed cloud agent is now authenticating a cloud provider's security manager.

According to an embodiment, at 3321, the enterprise interface deployment manager authenticates the security manager to specific rights, roles, and permissions within the enterprise environment.

At 3330, the enterprise interface deployment manager receives, via the security manager, an enterprise token that is specific to the enterprise environment. This is done in response to the successful authentication of the security manager as presented with the processing of 3320.

In an embodiment, at 3331, the enterprise interface deployment manager obtains the enterprise token in an encrypted format.

Continuing with the embodiment of 3331 and at 3332, the enterprise interface deployment manager uses a symmetric key to decrypt the encrypted format of the enterprise token.

At 3340, the enterprise interface deployment manager uses, via the security manager, the enterprise token to enforce cloud policy within the enterprise environment.

In an embodiment, at 3350, the enterprise interface deployment manager uses a PDP manager to enforce the cloud policy within the enterprise environment.

In another situation, at 3360, the enterprise interface deployment manager operates the security manager as a particular cloud environment interface within the enterprise environment.

So, one can now see via the discussions of FIGS. 1-3 how policy can be enforced from an enterprise environment within a cloud environment and from a cloud environment within an enterprise environment. The policy is identity-enabled via the authentication and identity mechanisms presented above.

Figure 4:
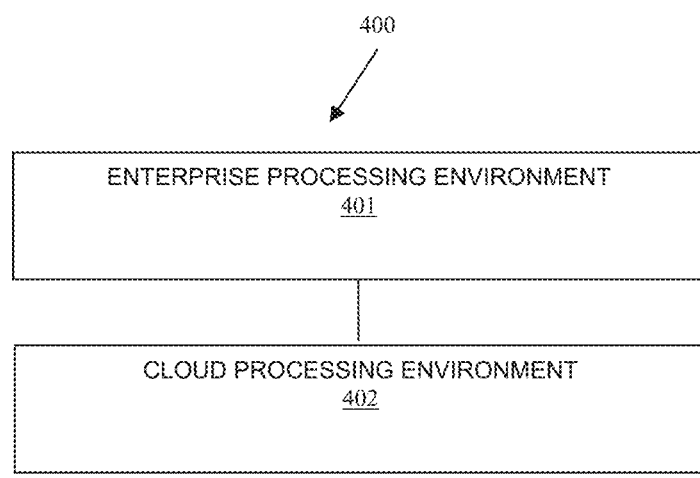
FIG. 4 is a diagram of an identity-enabled interface deployment system, according to an example embodiment.

FIG. 4 is a diagram of an identity-enabled interface deployment system 400, according to an example embodiment. Components of the identity-enabled interface deployment system 400 are implemented, reside, and programmed within non-transitory computer-readable storage medium as instructions that are executed on one or more processors of a network. The network can be wired, wireless, or a combination of wired and wireless.

In an embodiment, the identity-enabled interface deployment system 400 implements, inter alia, portions of the architecture presented above with respect to the FIG. 1 and the methods 200 and 300 of the FIGS. 2 and 3, respectively.

The identity-enabled interface deployment system 400 includes an enterprise processing environment 401 and a cloud processing environment 402. Each of these components and their interactions with one another will now be discussed in turn.

The enterprise processing environment 401 includes a plurality of enterprise processing devices. Example processing associated with the enterprise processing environment 401 was presented above with respect to the FIGS. 1 and 2.

The enterprise processing environment 401 configures a cloud agent for deployment to the cloud processing environment for purposes of enforcing enterprise policy within the cloud processing environment 402.

According to an embodiment, the cloud agent acquires a cloud token that is specific to the cloud processing environment 402 from a security manager to enforce the enterprise policy.

The cloud processing environment 402 includes a plurality of cloud processing devices. Example processing associated with the cloud processing environment 402 was presented above with respect to the FIGS. 1 and 3.

The cloud processing environment 402 uses a security manager of the cloud processing environment 402 to interact with the cloud agent for purposes of enforcing cloud policy in the enterprise processing environment 401.

In an embodiment, the security manager acquires an enterprise token that is specific to the enterprise processing environment 401 from the cloud agent for purposes of enforcing the cloud policy within the enterprise processing environment 401.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors configured to perform the method, comprising:

configuring a cloud agent for deployment within a target cloud environment, the cloud agent configured within an enterprise environment and the cloud agent is configured to process on processors of the target cloud environment and to use interfaces that the target cloud environment uses;

authenticating the cloud agent and obtaining a cloud agent identity;

assigning an expiration condition to the cloud agent identity that when satisfied renders the cloud agent identity invalid and providing the configured cloud agent with a mechanism to extend the expiration condition of the agent by obtaining other credentials to extend beyond the expiration condition by extending an expiration specification, wherein the agent uses the mechanism for raising a particular event that results in the agent obtaining the other credentials;

requesting, by the cloud agent, a security token from a security manager of the target cloud environment, the security token unique to the target cloud environment;

receiving, by the cloud agent, a token expiration condition with the security token, and when the token expiration condition is met, the security token becomes invalid for use within the target cloud environment; and deploying the cloud agent to the target cloud environment for enforcement of enterprise policy within the target cloud environment, via the cloud agent.

2. The method of claim 1 further comprising, using, by the cloud agent, the security token with each request issued within the target cloud environment to validate each request and to enforce the enterprise policy with each request.

3. The method of claim 1, wherein receiving a token expiration condition further includes identifying the token expiration condition as being different from the expiration condition of the cloud agent identity.

4. The method of claim 1 further comprising, recognizing, by the cloud agent, the security token as a globally unique identifier for the target cloud environment.

5. The method of claim 1 further comprising, using, by the cloud agent a cloud provider interface dictated by the target cloud environment to interact with the security manager.

6. The method of claim 1, wherein authenticating further includes interacting with an identity service and supplying credentials for the cloud agent, the credentials supplied by an administrator via an agent console.

7. The method of claim 1, wherein assigning further includes assigning the expiration condition as a time-to-live attribute to the cloud agent identity.

8. The method of claim 1, wherein deploying further includes using, by the cloud agent, the cloud agent identity to authenticate to the target cloud environment and to enforce the enterprise policy within the target cloud environment.

* * * * *